(12) United States Patent
    Bruce

(10) Patent No.: US 12,393,509 B2
(45) Date of Patent: Aug. 19, 2025

(54) TESTING AND DEPLOYMENT OF COMPONENTS AND APPLICATIONS IN CLOUD COMPUTING ENVIRONMENTS

(71) Applicant: Tricentis GmbH, Vienna (AT)

(72) Inventor: Paul Bruce, Gloucester, MA (US)

(73) Assignee: TRICENTIS GMBH, Vienna (AT)

( * ) Notice: Subject to any disclaimer, the term of this patent is extended or adjusted under 35 U.S.C. 154(b) by 151 days.

(21) Appl. No.: 18/305,140

(22) Filed: Apr. 21, 2023

(65) Prior Publication Data

US 2024/0354239 A1    Oct. 24, 2024

(51) Int. Cl.
   | | |
   |---|---|
   | G06F 11/00 | (2006.01) |
   | G06F 8/65 | (2018.01) |
   | G06F 8/71 | (2018.01) |
   | G06F 11/3604 | (2025.01) |
   | G06F 11/3668 | (2025.01) |

(52) U.S. Cl.
   CPC ............ G06F 11/3688 (2013.01); G06F 8/65 (2013.01); G06F 8/71 (2013.01); G06F 11/3612 (2013.01); G06F 11/3616 (2013.01); G06F 11/3692 (2013.01)

(58) Field of Classification Search
   CPC ............. G06F 11/3688; G06F 11/3612; G06F 11/3616; G06F 11/3692
   See application file for complete search history.

(56) References Cited

U.S. PATENT DOCUMENTS

| | | | | |
|---|---|---|---|---|
| 9,268,672 B1* | 2/2016 | Gupta | ............... | G06F 11/3684 |
| 10,223,242 B1* | 3/2019 | Kommera | ......... | G06F 11/3688 |
| 2014/0130036 A1* | 5/2014 | Gurikar | ............... | G06F 8/62 |
| | | | | 717/176 |
| 2017/0093684 A1* | 3/2017 | Jayaraman | ........... | G06F 11/008 |
| 2020/0250074 A1* | 8/2020 | Zhang | ............... | G06F 11/3664 |
| 2020/0358669 A1* | 11/2020 | Sinha | .................. | H04L 43/10 |
| 2022/0019524 A1* | 1/2022 | Ramachandran | ... | G06F 11/3688 |
| 2022/0138081 A1* | 5/2022 | Varma | ............... | G06F 11/3684 |
| | | | | 717/124 |
| 2022/0158926 A1* | 5/2022 | Wennerström | ...... | H04L 41/0883 |
| 2022/0214949 A1* | 7/2022 | Holt | ............... | G06F 11/2023 |
| 2024/0078169 A1* | 3/2024 | Sirvisetti | ............. | G06F 11/3692 |
| 2024/0289249 A1* | 8/2024 | Salehi | ................. | G06F 11/3692 |

* cited by examiner

Primary Examiner — Elmira Mehrmanesh
(74) Attorney, Agent, or Firm — Haynes and Boone, LLP

(57) ABSTRACT

A cloud computing system may be configured to test a cloud-native application to improve cloud-native application suitability. The system may include a processor and a computer readable medium operably coupled thereto, the computer readable medium including a plurality of instructions stored in association therewith that are accessible to, and executable by, the processor, to perform cloud-based testing operations which may include adjusting one or more of: a network path of an interaction among the plurality of interconnected subcomponents, the automated testing routine, or an infrastructure component affecting the cloud-native application. The cloud-based testing operations may further include observing one or more of cloud-native application testing results and cloud-native application system telemetry, determining a cloud-native application flaw based on the observed one or more of cloud-native application testing results and cloud-native system telemetry, and outputting one or more configuration adjustments based on the determined cloud-native application flaw.

20 Claims, 9 Drawing Sheets

TESTING AND DEPLOYMENT OF COMPONENTS AND APPLICATIONS IN CLOUD COMPUTING ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to cloud computing systems and environments, and more specifically to a system and method for automation of testing of cloud-native applications and other components prior to or during deployment in such cloud computing environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Cloud computing systems and environments may correspond to distributed computing environments of devices, servers, databases, sensors, and other infrastructure that may provide functions distributed over multiple locations and through different data centers. Cloud computing environments may provide one or more platforms that may host and/or execute applications, as well as assist in data storage, retention, processing, and the like. These systems and environments may include cloud-native applications and other components that may correspond to a collection of loosely coupled small independent services. Cloud-native applications involve many highly distributed microservices in an elastic infrastructure. Conventionally, application testing of software in different systems and environments may include traditional desktop application testing, web application testing, and mobile application testing. However, despite acceptance of application testing, techniques and systems related to cloud-native applications remain sparce.

Conventionally, when testing and/or deploying changes, updates, and/or new applications and components in computing systems, an entire system is changed to obtain a new backend version of an application or other component. This may also occur in cloud computing environments, which does not consider performance of services, devices and databases, computing availability, and/or network conditions that provide cloud computing operations and resources to users continuously during testing and deployment. Location of data centers and/or storage devices may also be affected, which may provide poor performance through a frontend application and/or interface. A conventional approach that is static and does not account for variable conditions and changes that affect the cloud computing environment may lead to poor performance, loss and/or poor data processing, overloading of different services acting as a backup, and other performance degradation. This is especially true for cloud computing environments that constantly provide computing services to users, businesses and other entities, and other requesters at all times of day and/or are expected to be available at all or specific times. Thus, conventional systems do not generally provide optimal testing and deployment of new and/or changed applications and components in cloud computing environments. Accordingly, there is a need for more, and more efficient, techniques for testing cloud-native applications and components when changes are made to back-end systems and versions in related cloud computing systems and environments.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
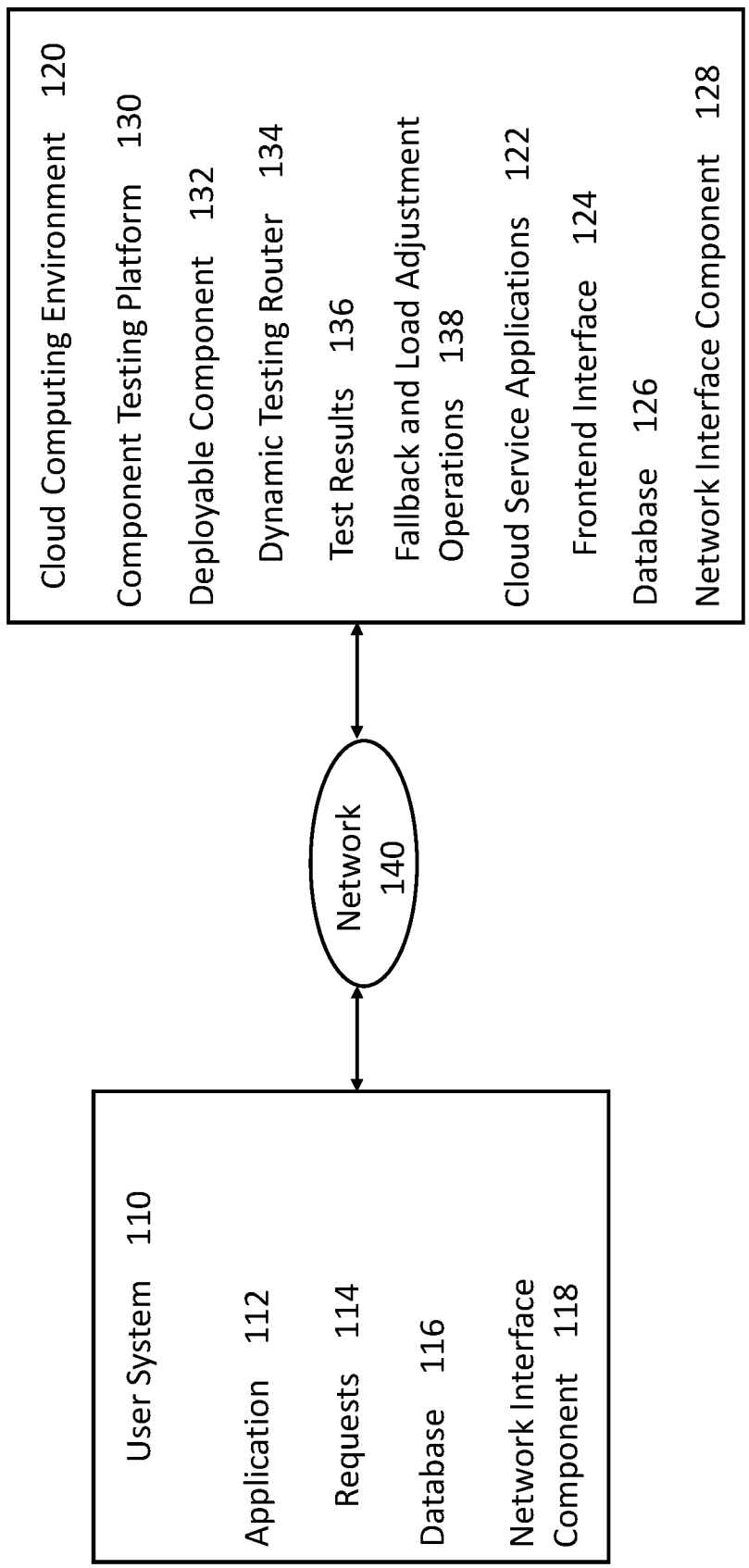
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For a serverless and/or distributed cloud computing system, methods, data structures, and systems are provided for optimized testing of new and/or updated applications and other components of the underlying system. A cloud computing system may correspond to a distributed set of devices and/or databases that allow for distributed computing and/or data storage. The testing environment may utilize a dynamic testing router, which may adjust loads between different backend components including the available or existing backend components and/or the new backend component. This allows for automated testing routines between different backend components when testing new (or updated/changed) backend components, as well as duplication of traffic for use while testing. Results may be observed and reported to allow for identification of issues, load problems, incompatibility or errors, or the like.

Further, a service mesh may be used to prevent and/or minimize overloading computing services, microservices, applications, or other computing components during certain system loads, errors, failsafe operations, and the like. The service mesh may utilize "circuit breakers" or operations and components that may be injected and may monitor for conditions that may "trip" or trigger the circuit breaker to lessen or back off an amount of load provided to a computing service or other component, prevent further traffic, loads, or data processing requests by the components, and/or provide other failsafe alternatives. Finally, instead of using a manual mode and/or tester to run a load test that simulates user inputs, a validation orchestrator may run in the backend of the cloud computing environment and provide a testing engine for a user interface, application, or the like in a frontend that may run recurring automated tests to simulate manual testers. These tests may be observed, and results provided back to the system for error detection and identification of user interface and/or system degradation and other reported system parameters and statistics during test load running.

The testing system may also utilize one or more machine learning (ML) or other artificial intelligence (AI) models and/or operations during testing and/or deployment. For example, an ML model may be trained to identify, from test results, faults, errors, and/or degradation of components and services based on errors (e.g., based on different input features from test results and/or threshold error and degradation levels or patterns). This may allow for automated storage management that proactively tests new and/or updates applications and other components in a cloud computing system in an optimized and efficient manner without manual intervention, testing, and/or reporting.

The embodiments described herein provide methods, computer program products, and computer database systems for automated testing and deployment of new and/or changed backend components to a cloud computing system and environment while maintaining proper response times, service level agreements (SLAs), component usage and load, and the like while assisting in preventing or minimizing degradation of components and performance. A service provider system may therefore include a cloud computing, data processing, application usage and execution, and data storage system that may proactively, efficiently, and safely test and deploy new or updated backend components in cloud computing systems. According to some embodiments, in a cloud computing system accessible by a plurality of separate and distinct organizations, automatic application and component testing for deployment in a cloud computing system is provided for dynamically testing, identifying overloaded components, and determining degradations, thereby optimizing testing operations, and providing faster and more coordinated, accurate, and efficient component testing.

Example Environment

The system and methods of the present disclosure can include, incorporate, or operate in conjunction with or in a cloud computing environment having an automatic testing and deployment system for cloud computing applications and other components, which may include new and/or updated backend components and/or versions of such components. FIG. 1 is a block diagram of a networked environment 100 suitable for implementing the processes described herein according to an embodiment. As shown, environment 100 may include or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. Similarly, ML and AI architectures have been developed to improve predictive analysis and classifications by systems in a manner similar to human decision-making, which increases efficiency and speed in performing predictive analysis, such as those during distribution of storage. One or more devices and/or servers may be operated and/or maintained by the same or different entities.

FIG. 1 illustrates a block diagram of an example environment 100 according to some embodiments. Environment 100 may include user system 110 and a cloud computing environment 120 that interact to provide cloud-based and/or native application and component testing for integration in cloud computing services and/or data storage. In other embodiments, environment 100 may not have all of the components listed and/or may have other elements instead of, or in addition to, those listed above. In some embodiments, the environment 100 is an environment in which cloud-native application and component testing may be performed through a testing and deployment system. As illustrated in FIG. 1, cloud computing environment 120 might interact via a network 140 with user system 110, which generate, provide, and output data loads and requests for cloud computing environment 120 that may be tested with new components, as well as updates to or new versions of existing components.

Cloud computing environment 120 may utilize a component testing platform 130 during testing of a cloud-native application or component prior to being deployed and/or once deployed in cloud computing environment 120 (e.g., for one or more computing services, microservices, and the like to handle data loads and processing requests, as well as cloud data storage requirements and operations). In this regard, user system 110 may include an application 112 that transmits requests 114 for usage of cloud computing services, including applications, data processing, and/or data storage by cloud computing environment 120, such as through one or more distributed devices, servers, databases, and/or other systems. User system 110 may access and utilize these cloud computing services and storages of cloud computing environment 120 via frontend interface 124 of cloud service application 122, such as one or more user interfaces of a website, web-based application, and/or resident software application. A web browser or dedicated software application may correspond to application 112. Once requests 114 are received via frontend interface 124, cloud computing environment 120 may utilize cloud service applications 122 to process requests 114 and provide the cloud-based services.

However, cloud computing environment 120 may test, deploy, and/or implement new components, as well as new versions and/or updates to existing components. These additions and/or changes may be to backend applications, operations, other hardware and/or software, and other components. In this regard, a deployable component 132 may be received and/or loaded to component testing platform 130 and/or in the backend computing infrastructure of cloud computing environment 120 for use with cloud service application 122. To test deployable component 132, component testing platform 130 may utilize a dynamic testing router 134, test results 136 result from circuit breaker tripping and load analysis, and fallback and load adjustment operations 138.

With dynamic testing router 134, a batch of test runs for data loads may be automatically generated and/or provided. The data loads for the test runs may be from an incoming stream of data requests and loads for a production computing environment and/or existing components and services. This may include generating synthetic users by automated testing routines and operations based on traffic through frontend interface 124 for testing with deployable component 132 or may include shifting the traffic to deployable component 132. Based on thresholds, SLAs, and the like, results may be provided that identify the observations and/or capabilities of deployable component 132. Test results 136 may result from testing circuit breakers or operations that may trip or trigger and prevent or slow traffic to a particular application or component based on overloading or overburdening deployable component 132 and/or another component. Test results 136 may be generated when traffic and/or duplicated traffic and synthetic users are shifted to a particular component to trip a fallback process.

Thus, fallback processes may further be tested and limits on the circuit breakers identified and/or confirmed. Fallback and load adjustment operations 138 may be used to provide one or more fallback measures, as well as perform load adjustments based on performance testing that may be improved and automated through a validation orchestrator. This validation orchestrator of fallback and load adjustment operations 138 may include user interface testing engines instead of manual testers that run automated user interface tests to detect degradation and/or slowing of particular user interfaces and/or components and elements in user interfaces, including those provided by backend elements that may be changed and/or added based on deployable component 132. Results of these tests may be provided to determine whether deployable component 132 causes errors, puts stress on the system, and/or causes degradation when provided traffic and data loads. These results may be compared to an acceptability threshold for acceptable degradation or determination of a need to load balance and/or adjust deployable component 132.

User system 110 may execute a web-based client that accesses a web-based application for cloud computing environment 120, or may utilize a rich client, such as a dedicated resident application, to access cloud computing environment 120. For example, user system 110 may utilize one or more application programming interfaces (APIs) to access and interface with cloud computing environment 120 in order to schedule, test, and/or review test results from component testing platform 130 when testing deployable component 132 based on duplicated or shifted traffic and other testing mechanisms described herein. Interfacing with cloud computing environment 120 may be provided through application 112 and may include data stored to database 116. Cloud computing environment 120 may process and provide data through cloud service applications 122, which may have components tested using component testing platform 130. Database 126 of cloud computing environment 120 may store data associated with testing of components and/or other corresponding operations, circuit breakers, user interfaces, and the like, as well as other data associated with cloud service applications 122 including traffic that may be used and/or duplicated for testing of new components and/or versions of existing components.

User system 110 might communicate with cloud computing environment 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between user system 110 and cloud computing environment 120 may occur over network 140 using a network interface component 118 of user system 110 and a network interface component 128 of cloud computing environment 120. In an example where HTTP/HTTPS is used, user system 110 might include an HTTP/HTTPS client commonly referred to as a "browser" for sending and receiving HTTP/HTTPS messages to and from an HTTP/HTTPS server, such as cloud computing environment 120 via the network interface component. Similarly, cloud computing environment 120 may host an online platform accessible over network 140 that communicates information to and receives information from user system 110 and/or other devices, servers, and systems. Such an HTTP/HTTPS server might be implemented as the sole network interface between user system 110 and cloud computing environment 120, but other techniques might be used as well or instead. In some implementations, the interface between user system 110 and cloud computing environment 120 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

User system 110 may utilize network 140 to communicate with cloud computing environment 120, as well as other devices, servers, and/or systems, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, cloud computing environment 120 is configured to provide webpages, forms, applications, data, and media content to user system 110 and/or to receive data from user system 110. In some embodiments, cloud computing environment 120 may be provided or implemented in a cloud environment, which may be accessible through one or more APIs with or without a correspond graphical user interface (GUI) output. Cloud computing environment 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence, such as one associated with cloud computing platforms and systems.

In some embodiments, user system 110, shown in FIG. 1, executes processing logic with processing components to provide data used for automated data storage discussed herein. For example, in one embodiment, user system 110 includes application servers configured to implement and execute software applications as well as provide related data, code, forms, webpages, platform components or restrictions, and other information associated with data sets used for automated data storage and/or storage device statistics, and to store to, and retrieve from, a database system related data, objects, and web page content associated with automated data storage and/or storage device statistics. For example, cloud computing environment 120 may implement various functions of processing logic and processing components, and the processing space for executing system processes, such as running applications for automated data storage. User system 110 may be accessible over network 140. Thus, cloud computing environment 120 may send and receive data to user system 110 via network interface component 128, and user system 110 may send and receive data to cloud computing environment 120 using network interface components 118. User system 110 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a storage service provider.

Several elements in the system shown and described in FIG. 1 include elements that are explained briefly here. For example, the client devices could include a desktop personal computer, workstation, laptop, notepad computer, PDA, cell phone, or any wireless access protocol (WAP) enabled device or any other computing device capable of interfacing directly or indirectly to the Internet or other network connection. User system 110 may also be a server or other online processing entity that provides functionalities and processing to other client devices or programs, such as online processing entities that provide services to a plurality of disparate clients.

User system 110 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, user system 110 and all of its components are configurable using applications, such as a browser, including computer code run using a central processing unit such as an Intel Pentium® processor or the like. However, user system 110 may instead correspond to a server configured to communicate with one or more client programs or devices, similar to a server corresponding to cloud computing environment 120 that provides one or more APIs for interaction with user system 110 for automated, efficient, and more accurate testing of applications and components based on traffic, data requests, and other data loads from user system 110.

Thus, user system 110 and/or cloud computing environment 120 (as well as any client devices) and all of their components might be operator configurable using application(s) including computer code to run using a central processing unit, which may include an Intel Pentium® processor or the like, and/or multiple processor units. A server for user system 110 and/or cloud computing environment 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring user system 110 and/or cloud computing environment 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Cloud-Native Application and Component Testing Operations

A cloud-native application may include one or more than one component (application/service), as described herein. For example, the cloud-native applications, services, and/or components may individually include a frontend component (application), a secondary set of services such as a login component (login application) that may itself involve a number of components (e.g., applications, user interfaces, software programs and operations, code snippets or packages for specific purposes, hardware and/or software for cloud computing, and the like), subcomponents (sub-applications) such as a credentialing subcomponent and the like. Accordingly, references to "components" and "subcomponents" herein may be interchangeable unless the context clearly indicates otherwise and may refer to various features, applications, interfaces, and the like utilized on and/or implemented in cloud computing environments.

Figure 2:
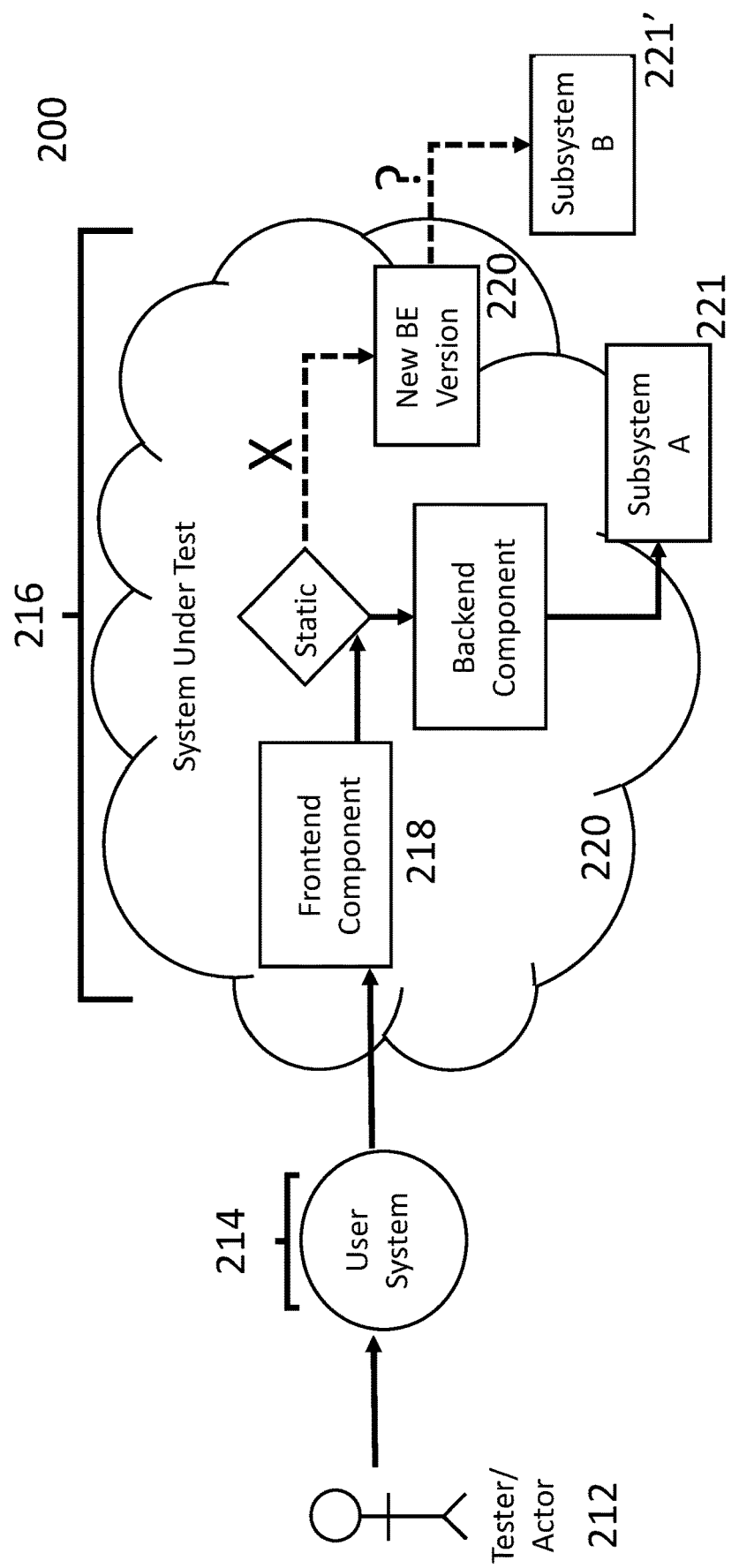
FIG. 2 is a schematic block diagram of a computerized testing of a new backend version of a cloud-native application or component in a cloud computing environment according to some embodiments.

FIG. 2 is a schematic block diagram 200 of a computerized testing of a new backend version of a cloud-native application or component in a cloud computing environment according to some embodiments. Diagram 200 of FIG. 2 includes components and operations utilized by a tester 212 with a user system 214, which may correspond to user system 110 discussed in reference to environment 100 of FIG. 1, to interact with a frontend component 218. Frontend component 218 may correspond to a web or cloud-based application, user interface, and/or other accessible resource or component to request data processing and/or otherwise provide data loads for processing, as well as testing of new components and/or versions of components. Frontend component 218 may interact with backend 216, which may provide distributed cloud computing services, platforms, environments, and/or other systems for use. In this regard, diagram 200 displays data operations and resulting data sets when performing manual testing by tester 212 using user system 214 to test a new application or component or version of such application or component.

In diagram 200, tester 212 may use a computing device corresponding to user system 214 to access frontend component 218 (e.g., web-based application) and to access, request data processing from, and/or perform data storage with backend 216 of the application to be tested. Backend 216 may include frontend component 218 acting as a user interface and/or application that is in communication with backend components 220, 220', 221, and 221' of the cloud-native application or other component. In the example in diagram 200 shown in FIG. 2, a new backend component 220' accessing a new subcomponent 221' may be implemented to replace or augment existing backend component 220 and subcomponent 221. As an example, new backend component 220' may be implemented using a canary rollout, where a small percentage (e.g., 1%) of traffic to the cloud-native application traffic may be routed to new backend component 220' and subcomponent 221'.

Tester 212 may selectively initiate one or more tests. For example, tester 212 may implement tests of new backend component 220'. However, suitability testing of the cloud-native application, service, microservice, or other component including new backend component 220' may be limited in diagram 200. For example, diagram 200 may not be able to generate adequate testing results and cloud-native application system telemetry. Deficiencies in the testing may be caused by the selective nature with which the tester 212 may initiate the tests, which may also be caused by the lack of information (incomplete coverage) regarding backend 216 of the application or other component being tested for implementation of new backend component 220' with new subcomponent 221'. In this regard, a dynamic testing router may be implemented in order to provide an automated testing routine that adjusts traffic and/or other loads (e.g., data loads for data processing requests), which may utilize live traffic from a production computing environment and/or pool of machines, applications, and/or components, as well as or alternatively, synthetic users and duplicated traffic and data loads, as discussed in further detail with regard to FIG. 5 below.

Figure 3:
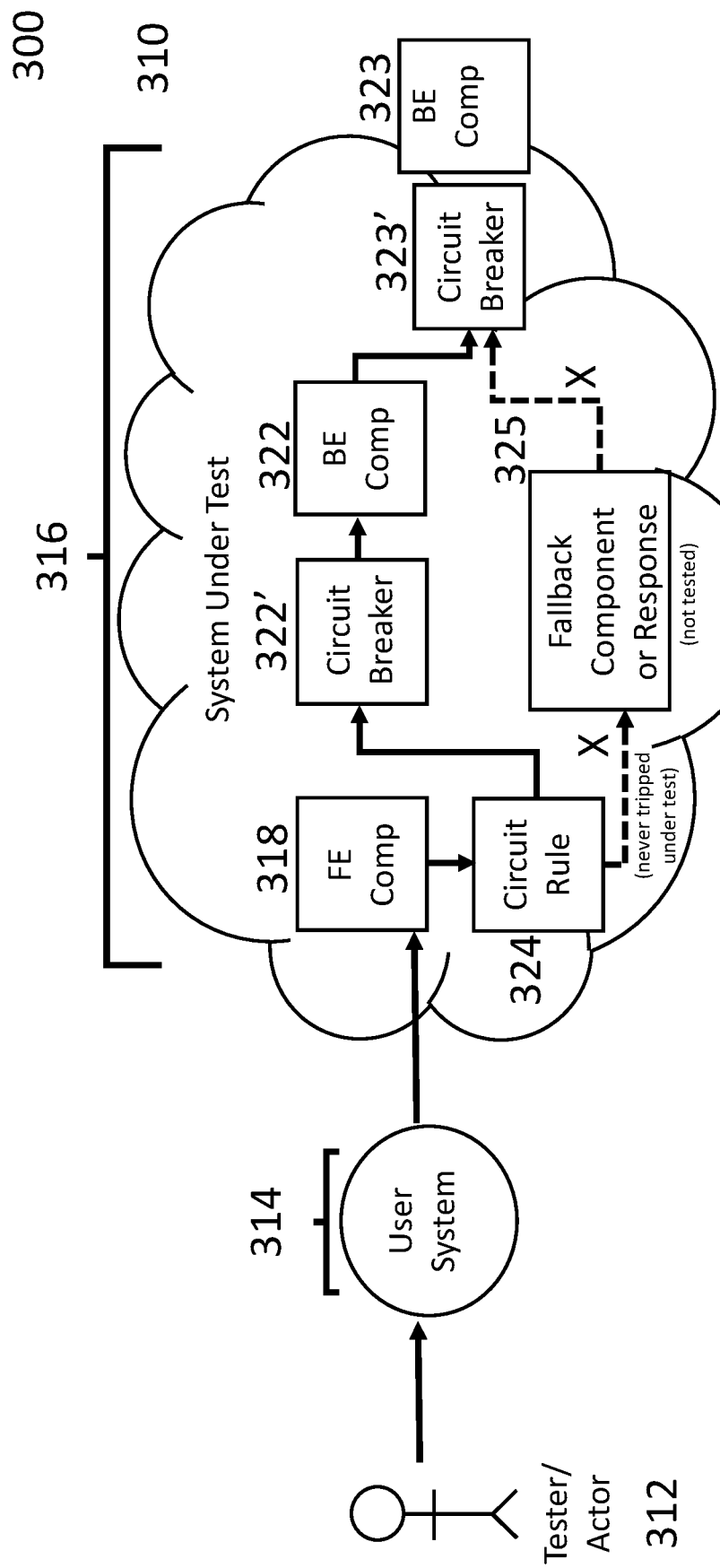
FIG. 3 is a schematic block diagram of a computerized testing a cloud-native application or component in a cloud computing environment without triggering circuit breakers to test load on fallback applications and components according to some embodiments.

FIG. 3 is a schematic block diagram 300 of computerized testing of a cloud-native application or component in a cloud computing environment without triggering circuit breakers to test load on fallback applications and components according to some embodiments. Diagram 300 of FIG. 3 includes components and operations utilized by a tester 312 with a user system 314, which may correspond to user system 110 discussed in reference to environment 100 of FIG. 1, to interact with a frontend component 318. Frontend component 318 may correspond to a web or cloud-based application, user interface, and/or other accessible resource or component to request data processing and/or otherwise provide data loads for processing, as well as testing of new components and/or versions of components. Frontend component 318 may interact with backend 316, which may provide distributed cloud computing services, platforms, environments, and/or other systems for use. In this regard, diagram 300 displays data operations and resulting data sets without testing to trigger or trip circuit breakers and determine effects on frontend component 318.

In diagram 300, the tester 312 may use a computing device corresponding to user system 314 to access the frontend component 318 and to access, request data processing from, and/or perform data storage with backend 316 of the application to be tested. In this scenario, a focus of the test may be to perform circuit breaking (e.g., tripping or triggering of circuit breaker 322' or 323') of the cloud-native application, service, microservice, or another component. Backend 316 may communicate with frontend component 318 such that frontend component 318 may be in communication with backend components 322 and 323, which may be provided with circuit breakers 322' and 323', as well as a fallback component 325. Circuit breakers 322' and 323' may be injected components and may be injected by the service mesh into the corresponding service or other cloud-native application that may provide cloud-based computing resources and storages to users. A circuit breaker may be designed to monitor for a variety of conditions which may "trip" the circuit breaker resulting in a variety of responses, such as a load backoff (e.g., throttling or decreasing incoming traffic and other data loads) or failsafe alternatives. For example, circuit breakers 322' may include a set threshold value for a circuit rule 324 that once reached, may cause circuit breaker 322' to "trip". In the scenario shown in diagram 300 of FIG. 3, if backend component 322 reaches a maximum number of allowable errors, circuit breaker 322' may be designed to trip causing traffic to no longer be routed to backend component 322 and then backend component 323, and instead be routed to fallback component 325, or other fallback route, and then to backend component 323. Numerous other actions could be taken in the event of a circuit breaker trip.

Tester 312 may implement one or more tests that relate to circuit breakers 322' and 323' based on circuit rule 324. Suitability testing of the cloud-native application (including circuit breakers 322' and 323') may be limited using diagram 300. For example, diagram 300 may not be able to reliably test actual load-level tripping of the circuit breakers 322' and 323'. That is, one tester (or even a small group of testers) selectively accessing the cloud-native application for testing purposes may never even trip circuit breakers 322' and 323' based on circuit rule 324. If circuit breaker 322' is never tripped, fallback component 325 (and related routing) may never even be tested. Moreover, even if circuit breaker 322' can be manually tripped using circuit rule 324 (e.g., by reducing a threshold for testing purposes), actual tripping of circuit breaker 322' (including unforeseen reactions) will not be tested or at least fully tested. Thus, automated testing may force circuit breaker tripping or breaking in order to identify issues in frontend component 318 and/or failover conditions and fallback components, services or microservices, data loads and system overloading, and the like, as discussed in further detail with regard to FIG. 6 below.

Figure 4:
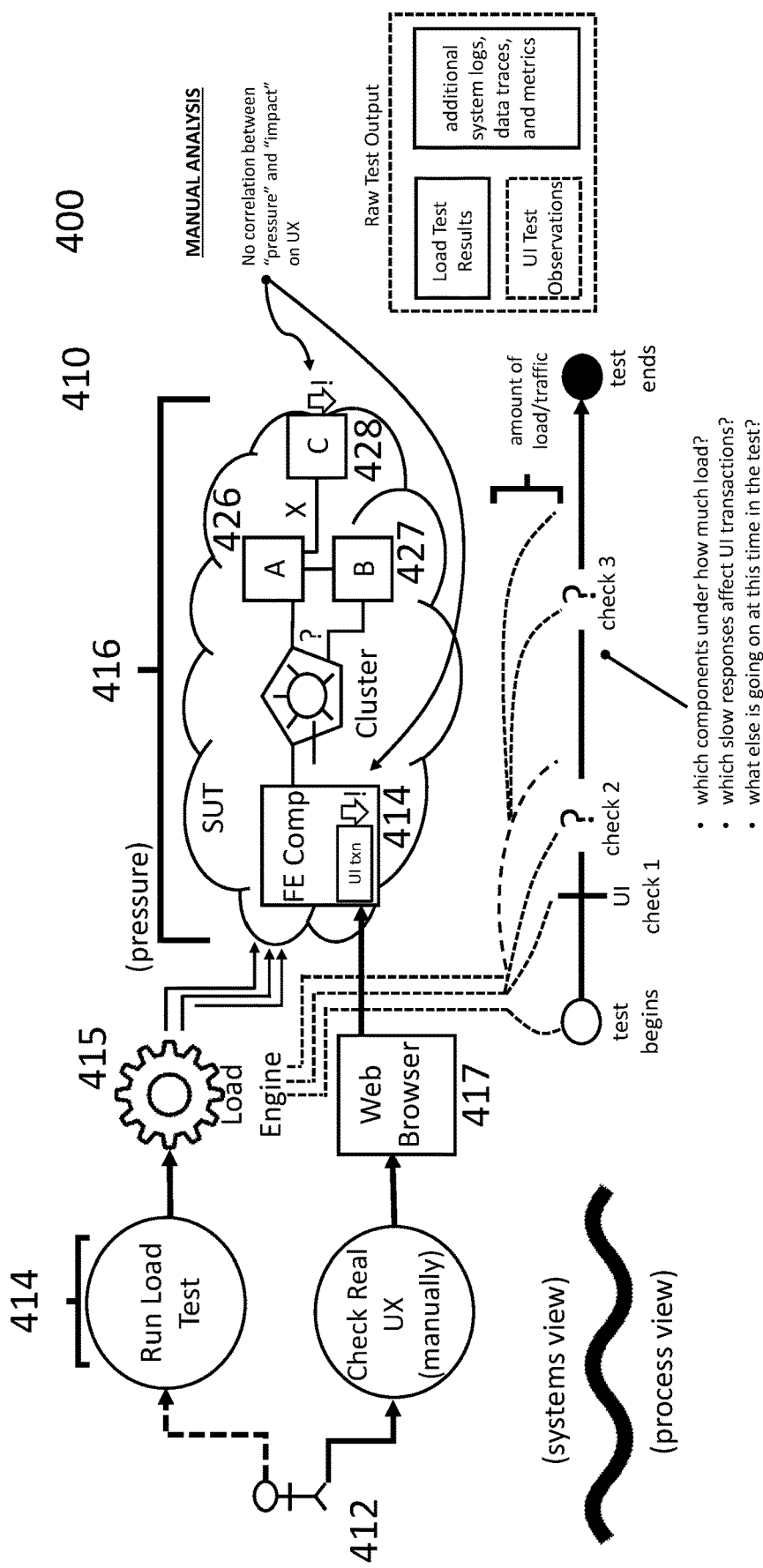
FIG. 4 is a schematic block diagram of a computerized testing of a new backend version of a cloud-native application or component in a cloud computing environment with manual analysis of performance and performance degradation of the application or component according to some embodiments.

FIG. 4 is a schematic block diagram 400 of a computerized testing of a new backend version of a cloud-native application or component in a cloud computing environment with manual analysis of performance and performance degradation of the application or component according to some embodiments. Diagram 400 of FIG. 4 includes components and operations utilized by a tester 412 with a user system 414, which may correspond to user system 110 discussed in reference to environment 100 of FIG. 1, to interact with a frontend component 418 through both a load testing engine 415 and a web browser 417. Frontend component 418 may correspond to a web or cloud-based application, user interface, and/or other accessible resource or component to request data processing and/or otherwise provide data loads for processing, as well as testing of new components and/or versions of components. Frontend component 418 may interact with backend 416, which may provide distributed cloud computing services, platforms, environments, and/or other systems for use. In this regard, diagram 400 displays data operations and resulting data sets when a manual tester interfaces with a load engine and a web browser to manually provide tests and monitor results for issues, degradation, and/or slowdown in frontend component 418, such as different user application and/or interface elements, operations, data, and/or display outputs caused by a new component or version of a component being tested.

In diagram 400, the tester 412 may use a computing device corresponding to user system 414 to access the frontend component 418 and to access, request data processing from, and/or perform data storage with backend 416 of the application to be tested. In this scenario, a focus of the test is performance of the cloud-native application. Backend 416 may include frontend component 418 acting as an interface or application in communication with backend components 426, 427, and 428. Focusing on frontend component 418, in a manual mode, tester 412 (or a group of multiple testers) may use a computing device to access frontend component 418 via an actual user experience (e.g., access web browser 417). Tester 412 may also run a load test which may use load testing engine 415 simulating inputs of multiple (many) users (functional samplers). For example, the load test may use protocol testing simulating many synthetic requests and responses to the cloud-native application. Load testing engine 415 may be used to efficiently place considerable load pressure on the backend 416 of the cloud-native application including backend components 426, 427, and 428.

However, tester 412 may run a load test triggering load testing engine 145 to apply significant pressure to backend 416, while also at the same time accessing backend 416 using one or more user terminals (e.g., via web browser 417) so as to monitor and test actual user experience in view of the load test. Even where load testing engine 415 may be used to apply pressure to the cloud-native application along with coordinated manual testers viewing the user experience and interfaces provided by frontend component 418 through web browser 417, diagram 400 may still have shortcomings. For example, after a start of the testing, information may be returned from many different sources as different datasets. Data from load testing engine 415 tool may be returned as functional sampler log data relevant to the test. Selected telemetry from backend 416 of the cloud-native application may also be returned, although conventionally, such data may be limited in quantity and/or quality.

With the above information being returned, diagram 400 may be deficient in that it may be difficult to determine correlations between load testing engine 415's dataset, the functional sampler dataset, and the selected telemetry from backend 416 of the cloud-native application. For example, it may be difficult to determine which slow responses observed in backend components 426, 427, and 428 relate to which slow browser load operations observed in the functional sampler dataset. In addition, there may be other factors not traced during the test that may also affect system performance. In short, there may be no correlation between pressure on the cloud-native application and impact on user-experience.

Finally, diagram 400 may require subjective manual correlation of load testing engine 415 dataset, the functional sampler dataset, and the select telemetry from backend 416 of the cloud-native application to identify potential faults of the cloud-native application affecting performance. That is, diagram 400 may generate raw output that may require human expertise to interpret. Further, the returned data may not be presented against quantified service level objectives. As such, a validation orchestrator may be used to run recurring automated user interface tests that apply data load processing pressure to test frontend component 418, as discussed in further detail with regard to FIG. 7 below.

Figure 5:
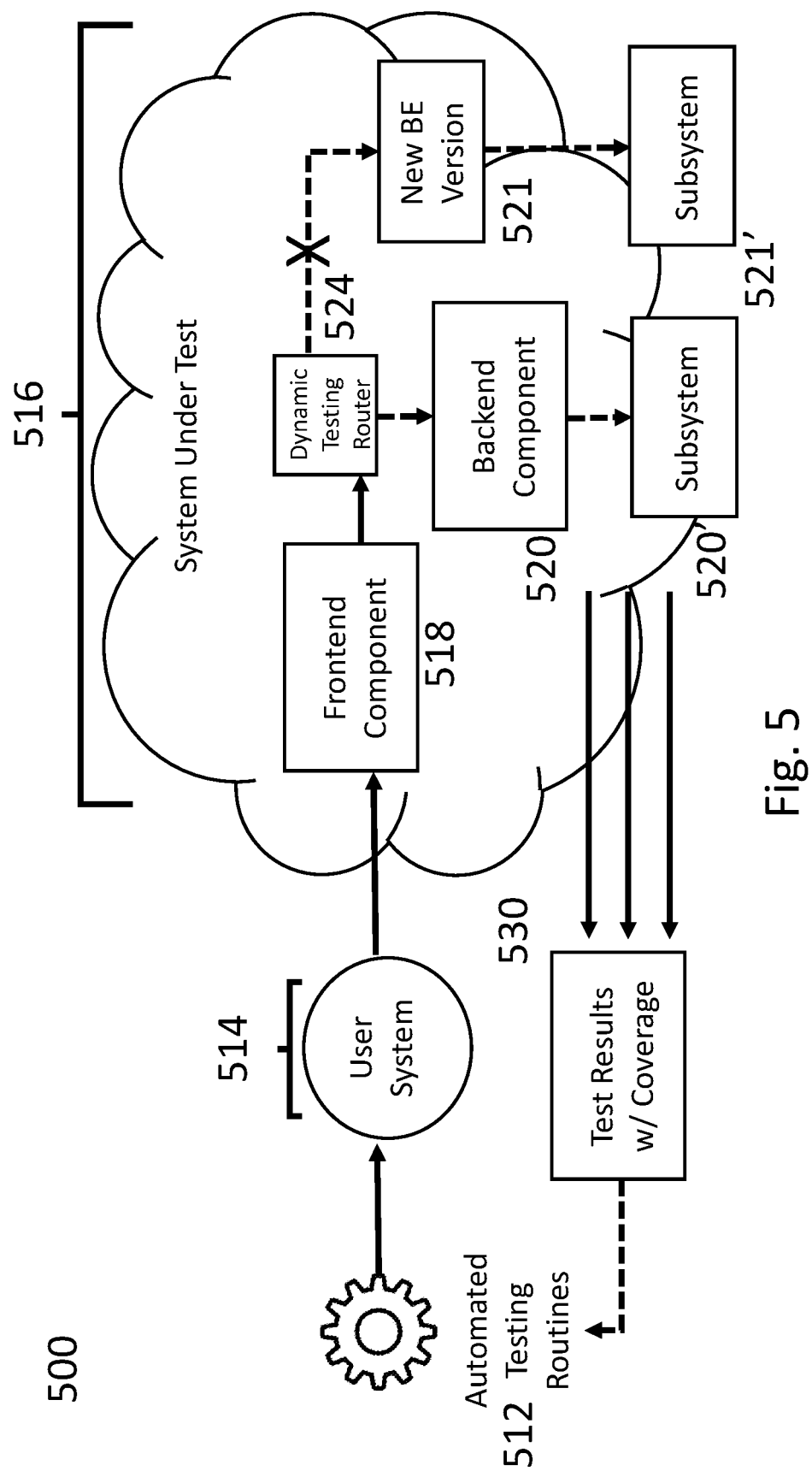
FIG. 5 is a schematic block diagram of a computerized testing of a new backend version of a cloud-native application or component in a cloud computing environment using a dynamic testing router according to some embodiments.

FIG. 5 is a schematic block diagram 500 of computerized testing of a new backend version of a cloud-native application or component in a cloud computing environment using a dynamic testing router according to some embodiments. Diagram 500 of FIG. 5 includes components and operations performed by automated tests 512 through a user system 514, which may correspond to user system 110 discussed in reference to environment 100 of FIG. 1, to interact with a frontend component 518. Frontend component 518 may correspond to a web or cloud-based application, user interface, and/or other accessible resource or component to request data processing and/or otherwise provide data loads for processing, as well as testing of new components and/or versions of components. Frontend component 518 may interact with backend 516, which may provide distributed cloud computing services, platforms, environments, and/or other systems for use. In this regard, diagram 500 displays data operations and resulting data sets when a dynamic testing route is used to generate, provide, and/or coordinate automated testing of a new application or component or version of such application or component.

Diagram 500 of FIG. 5 shows various potential advantages with respect to automated testing routines and improved cloud-native path coverage. The computerized testing process in diagram 500 may include accessing the cloud-native application using an automated testing routine of the testing method shown in diagram 500. That is, instead of or in addition to tester 12 of FIG. 2, one or more automated testing routines 502 of a computing device may access frontend component 518, which may provide access to backend 516 of the cloud-native application to be tested. The backend may therefore be in communication with the frontend component 518 and one or more backend components 520, 520', 521, 521' of the cloud-native application. The computerized testing process in diagram 500 may include adjusting a network path of one or more interactions among the interconnected backend components 520 and 521 and backend subcomponents 520' and 521'. The automated testing routine itself and/or an infrastructure component affecting the cloud native application may also be adjusted.

In some embodiments, diagram 500 may involve deployment of a dynamic testing router 524. Dynamic testing router 524 may be deployed as a component (or series of coordinated components) within a service mesh of the cloud-native application and corresponding components, computing services, and/or microservices. That is, in addition to service mesh sidecars (e.g., proxies that may intercept and manage interservice communications associated with service mesh patterns), dynamic testing router 524 may exist within the service mesh. For example, dynamic testing router 524 may exist as an addition to a sidecar. The dynamic testing router 524 may be in communication with the frontend component 518 and backend components 520, 520', 521, 521'. Similar to the example discussed above with respect to diagram 200 of FIG. 2, new backend component 521 accessing subcomponent 521' may be implemented to replace or augment existing backend component 520 and subcomponent 520'.

Continuing with the canary rollout example, the dynamic testing router 524 may enable adjustment of loads between backend component 520 and the new backend component 521. That is, the network path of an interaction among backend components 520, 520', 521, 521' may be adjusted. For example, when a number (e.g., 1000) of synthetic users are generated by one or more of automated testing routines 502, traffic (e.g., all traffic) to backend component 520 (and subcomponents such as 520') may interface through dynamic testing router 524. Dynamic testing router 524 may cause a certain volume of traffic to continue to backend component 520 while causing another volume of traffic to be shifted to the new backend component 521. In another embodiment, instead of shifting traffic, a percentage of traffic may be duplicated instead. Through shifting or duplicating, if an acceptability threshold is exceeded, dynamic testing router 524 may stop sending traffic to the new backend component 521. The threshold may be based on data processing statistics and/or results of new backend component 521 including the processing throughput, slowdown, degradation etc., of or caused by new backend component 521. This approach may apply in a production environment test, but also during development and staging, such as in a test environment and/or during component deployment.

The computerized testing process in diagram 400 may include observing one or more of cloud-native application testing results and application system telemetry 530. The cloud-native application testing results and application system telemetry 530 may include tracing data (discussed more below with respect to FIG. 7), evidence of use of a container, and resource utilization metrics. As an example, resource utilization metrics may indicate a cloud-native application flaw by indicating resource utilization not corresponding to a desired load profile. Cloud-native application testing results and application system telemetry 530 may be returned to the computerized method of testing through the use of sidecars and/or dynamic testing router 524. Continuing with the canary example, dynamic testing router 524 may communicate information regarding the shifting and/or duplicating of traffic to backend component 521 from backend component 520, and/or vice versa when an acceptability threshold may be met or exceeded and traffic may stop or be slowed to backend component 521. Cloud-native application system telemetry may be returned via trace data that may be reported by backend components (e.g., backend components 520, 520', 521, 521'). For example, dynamic testing router 524 may inject the trace data into traffic, and the trace data may have baggage data as part of its trace that may be reported from the components (systems) to a repository and/or reported from dynamic testing router 524.

Figure 6:
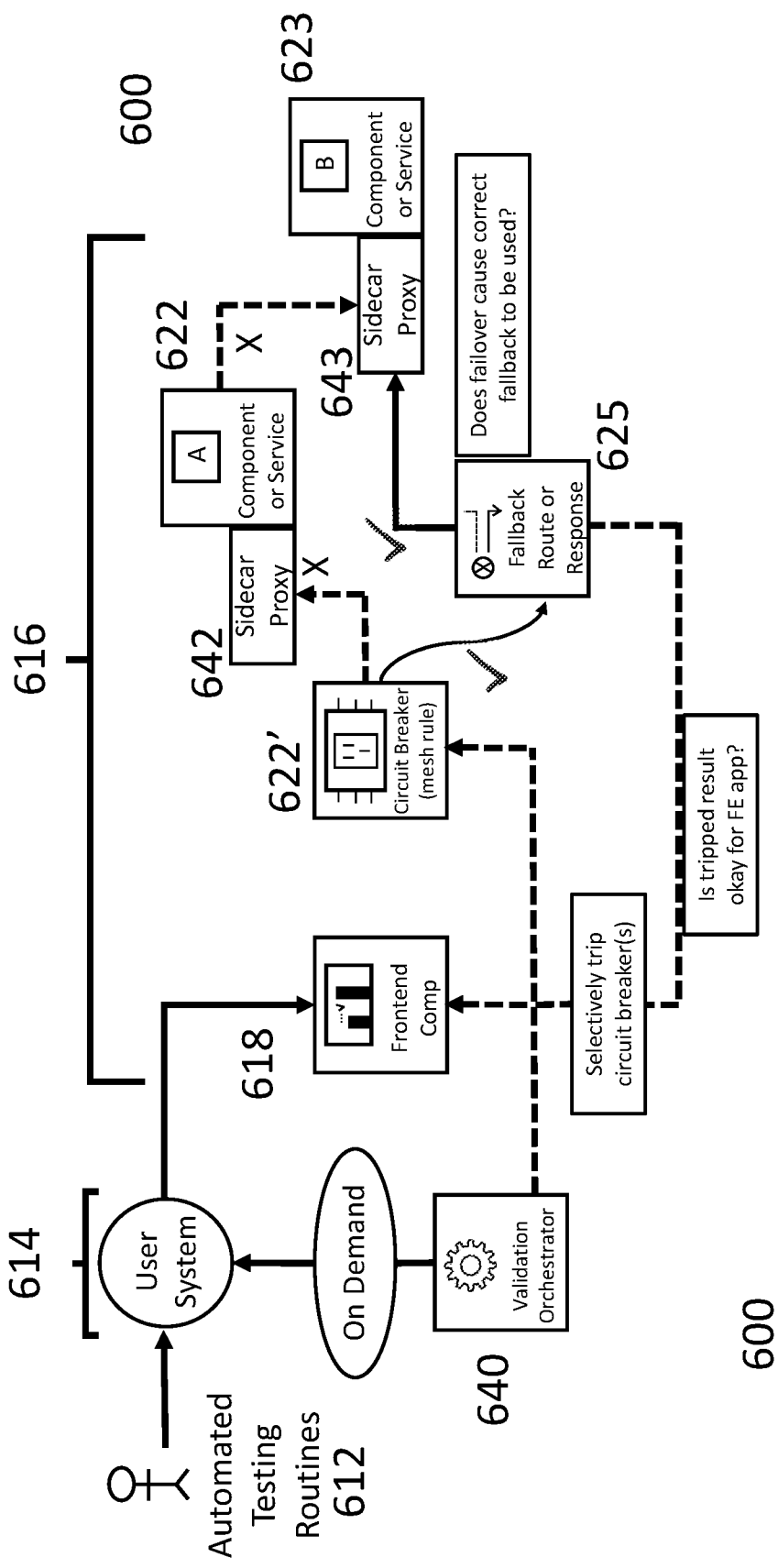
FIG. 6 is a schematic block diagram of a computerized deployment of a new backend version of a cloud-native application or component in a cloud computing environment where circuit breakers are forced to trigger during testing to determine loads on fallback applications and components according to some embodiments.

FIG. 6 is a schematic block diagram 600 of a computerized deployment of a new backend version of a cloud-native application or component in a cloud computing environment where circuit breakers are forced to trigger during testing to determine loads on fallback applications and components according to some embodiments. Diagram 600 of FIG. 6 includes components and operations performed by a tester, such as automated testing routines 612, through a user system 614, which may correspond to user system 110 discussed in reference to environment 100 of FIG. 1, to interact with a frontend component 618. Frontend component 618 may correspond to a web or cloud-based application, user interface, and/or other accessible resource or component to request data processing and/or otherwise provide data loads for processing, as well as testing of new components and/or versions of components. Frontend component 618 may interact with backend 616, which may provide distributed cloud computing services, platforms, environments, and/or other systems for use. In this regard, diagram 600 displays data operations and resulting data sets when triggering or tripping circuit breakers to test effects on frontend component 618.

Diagram 600 of FIG. 6 shows various potential advantages with respect to testing of circuit breaking of the cloud-native application and corresponding circuit breakers for components of backend 616. In diagram 600, the cloud-native application may be accessed using an automated testing routine 612 of the testing method. For example, instead of or in addition to the tester 212 of FIG. 2, one or more of automated testing routines 612 of a computing device, such as user system 614 and/or a pool or set of machines and/or devices, may access frontend component 618, which may provide access to backend 616 of the cloud-native application to be tested. In this scenario, frontend interface 618 may be in communication with backend components 622 and 623, where backend component 622 may be provided with circuit breaker 622'. A fallback component or route 625 may further be provided, which may utilize backend component 623 during tripping or triggering (e.g., meeting or exceeding an acceptability threshold for impact, degradation, slowdown, or errors in frontend component 618 and/or backend component 622).

The computerized testing process may further include a validation orchestrator 640. As described more below in conjunction with FIG. 7, validation orchestrator 640 may be shown as part of frontend component 618, but actually may exist or run in backend 616. The computerized testing process in diagram 600 may include adjusting a network path of one or more interactions among the interconnected backend components 622 and 623 (including circuit breaker 622') with route 625, the automated testing routine itself, and/or an infrastructure component affecting the cloud native application so as to create conditions that force an overload of circuit breaker 622'. For example, validation orchestrator 640 may coordinate overload of one or more circuit breakers (e.g., circuit breaker 622'). By using synthetic users to overload and thus actually trip circuit breaker 622', actual trip fallback processes (including unforeseen reactions) may be more fully tested.

The computerized testing process in diagram 600 may further include sidecar proxies 642 and 643. Sidecar proxies 642 and 643 may communicate or indicate the tripping of circuit breaker 622'. The computerized testing process may include observing one or more of cloud-native application testing results and cloud-native application system telemetry. For example, when circuit breaker 522' is tripped, cloud-native application system telemetry may be received that indicates that traffic from frontend component 618 is being routed to fallback component or route 625. However, in another situation it may be observed that when circuit breaker 622' is tripped, cloud-native application system telemetry may be received indicating that traffic is not being routed to fallback component or route 625. In such a situation, the computerized testing process may determine a cloud-native application flaw based on the observation of cloud-native application testing results and cloud-native system telemetry. For example, it may be determined that the fallback component or route 625 is flawed. In an embodiment, one or more configuration adjustments may be output from the computerized testing process in diagram 600 based on the determined cloud-native application flaw.

Figure 7:
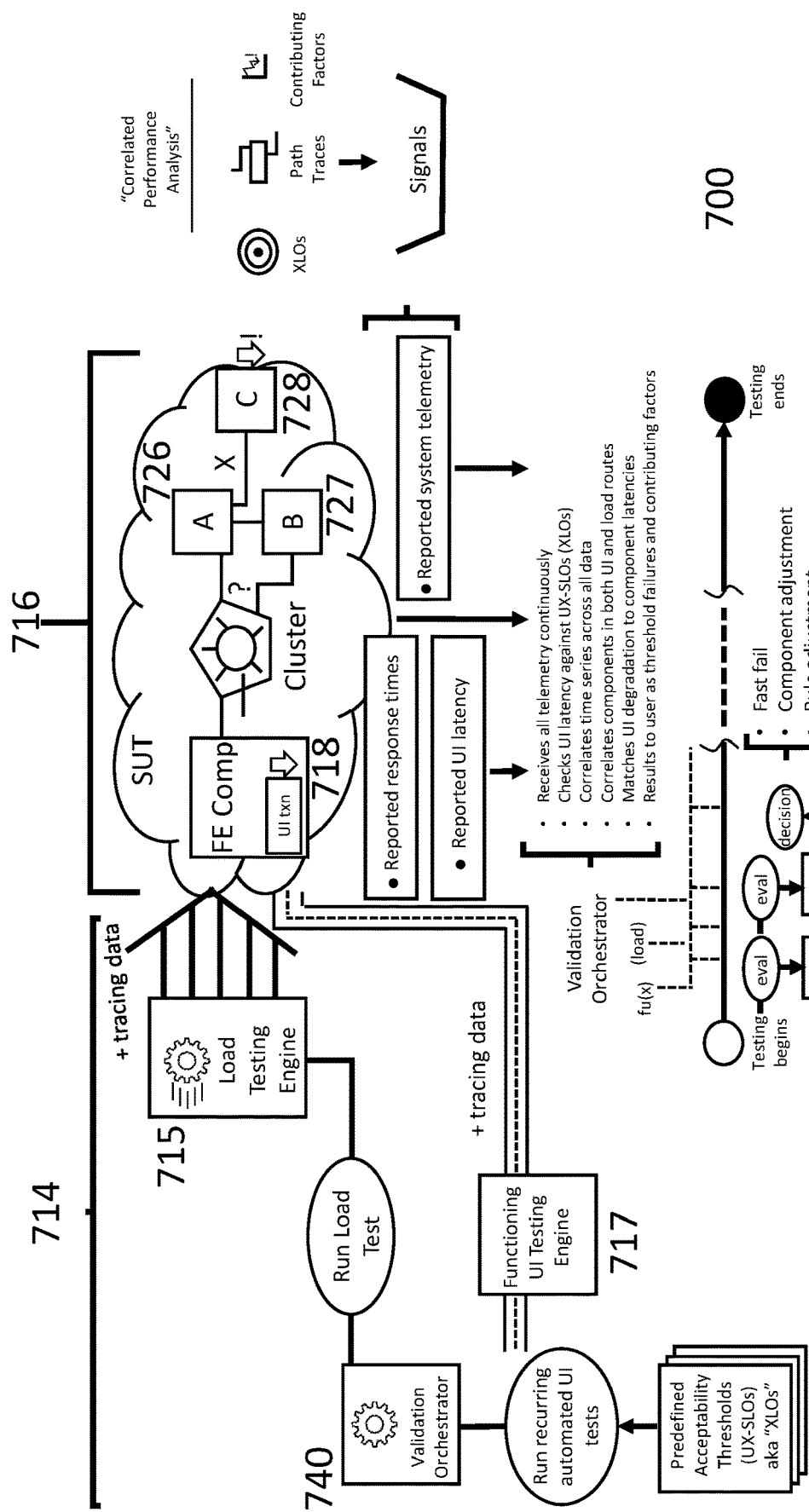
FIG. 7 is a schematic block diagram of a computerized deployment of a new backend version of a cloud-native application or component in a cloud computing environment where test loads are run, and a validation orchestrator reports performance analysis of the new or updated application or component according to some embodiments.

FIG. 7 is a schematic block diagram 700 of a computerized deployment of a new backend version of a cloud-native application or component in a cloud computing environment where test loads are run, and a validation orchestrator reports performance analysis of the new or updated application or component according to some embodiments. Diagram 700 of FIG. 7 includes components and operations utilized by a validation orchestrator 740, which may correspond to one or more computing devices, virtual machines, cloud computing services and/or microservices, and the like that may perform operations with cloud computing environment 120 discussed in reference to environment 100 of FIG. 1. Validation orchestrator 740 may be executed and perform in a frontend 714 and interact with frontend component 718 through a load engine 715. Frontend component 718 may correspond to a web or cloud-based application, user interface, and/or other accessible resource or component to request data processing and/or otherwise provide data loads for processing, as well as testing of new components and/or versions of components. Frontend component 718 may interact with backend 716, which may provide distributed cloud computing services, platforms, environments, and/or other systems for use. In this regard, diagram 700 displays data operations and resulting data sets when utilizing a validation orchestrator in order to test issues, degradation, and/or slowdown in frontend 714 and/or frontend component 718, such as different user application and/or interface elements, operations, data, and/or display outputs caused by a new component or version of a component being tested.

Diagram 700 of FIG. 7 shows various potential advantages with respect to improved performance testing. The computerized testing process in diagram 700 may include validation orchestrator 740 accessing the cloud-native application from frontend 714 via frontend component 718. It should be borne in mind that although validation orchestrator 740 is shown as an element of frontend 714 of the cloud-native application, validation orchestrator 740 may instead run in backend 716 of the cloud-native application (e.g., be a part of the cluster including backend components 726, 727, and 728). For example, with respect to Kubernetes, the validation orchestrator 740 may run in the same or similar context as the cloud-native application. The computerized testing process in diagram 700 may include a functional user interface testing engine 717 instead of (or in addition to) manual testers (functional samplers). Functional user interface testing engine 717 may run recurring automated user interface tests that simulate manual testers. Validation orchestrator 740 may coordinate load testing engine 715 to apply pressure to the cloud-native application and the functional user interface testing engine 717, such as based on data loads and other processing requests from diverted, shifted, or duplicated traffic for the cloud-native application.

The computerized testing process in diagram 700 may include accessing the cloud-native application using validation orchestrator 740 via an automated testing routine of the testing process. That is, validation orchestrator 740 may cause load testing engine 715 and the functional user interface testing engine 717 to access the cloud-native application with requests and responses and may include tracing data (e.g., as a header or packet). The tracing data may start in frontend component 718 and may call to backend components 726, 727, and 728 to continue tracing data throughout the application (test). The tracing data including baggage data may be returned to the computerized testing process. The computerized testing process may include adjusting a network path of one or more interactions among backend components 726, 727, and 728, the automated testing routine itself, and/or an infrastructure component affecting the cloud native application.

The computerized testing process in diagram 700 may include observing, by the computerized process, one or more of cloud-native application testing results and cloud-native application system telemetry. For example, testing results system telemetry may be received via baggage data of the tracing data. The traced data may be returned to the validation orchestrator 740 as part of the executed process and operations. The traced data may enable path tracing through the cloud-native application. Through reporting the traced data to validation orchestrator 740, the validation orchestrator 740 may receive telemetry data continuously, user interface latency, and reported system telemetry, all coordinated with output from load testing engine 715 and functional user interface testing engine 717.

The computerized testing process in diagram 700 may include determining a cloud-native application flaw based on the observed one or more of cloud-native application testing results and cloud-native system telemetry, and outputting, by the computerized process, one or more configuration adjustments based on the determined cloud-native application flaw, such as adjustments to computing operations, code, API specifications, connected components and/or data transmission elements, and the like. This may be used to change or configure backend component 728 for improved performance and/or compatibility. For example, traced data may indicate that backend component 728 is responding slower than expected. Through the coordinated data, a cloud-native application flaw may be identified, and configuration adjustment may be made. A fast failure of backend component 728 may be executed, adjustment to backend component 728 may be performed (scaling up, e.g., of hardware), and/or a change may be made to the rule for the degradation threshold(s) of the test.

Figure 8:
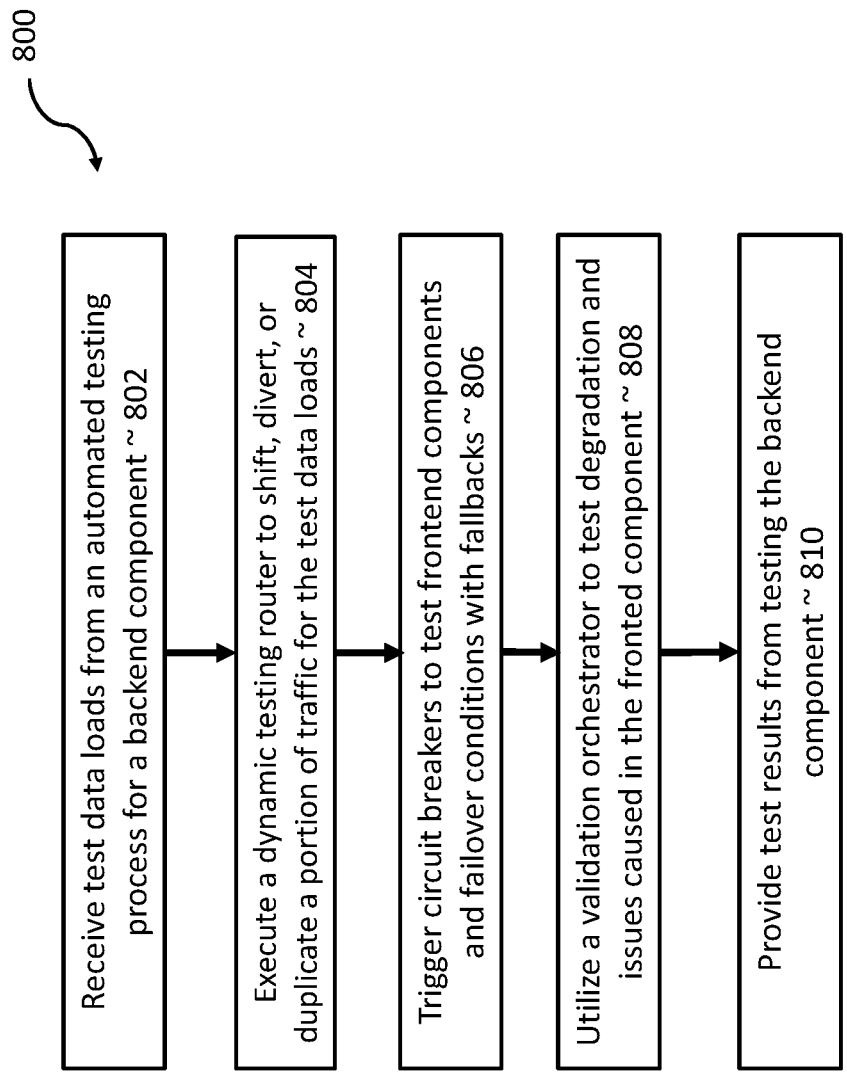
FIG. 8 is a simplified diagram of an exemplary flowchart for automatic storage management between data recorders and storage devices by a storage load balancer based on monitored statistics from storage monitoring services according to some embodiments.

FIG. 8 is a simplified diagram of an exemplary flowchart 800 for automatic storage management between data recorders and storage devices by a storage load balancer based on monitored statistics from storage monitoring services according to some embodiments. Note that one or more steps, processes, and methods described herein of flowchart 800 may be omitted, performed in a different sequence, or combined as desired or appropriate. Flowchart 800 of FIG. 8 includes operations for performing automated testing of new backend components and/or versions of existing components as discussed in reference to FIG. 1-7. One or more of the steps 802-810 of flowchart 800 may be implemented, at least in part, in the form of executable code stored on non-transitory, tangible, machine-readable media that when run by one or more processors may cause the one or more processors to perform one or more of the steps 802-810. In some embodiments, flowchart 800 can be performed by one or more computing devices discussed in environment 100 of FIG. 1, as well as those in diagrams 200, 300, 400, 500, 600, and 700 of FIGS. 2-7.

At step 802 of flowchart 800, test data loads from an automated testing process for a backend component is received. The test data loads may be provided based on selections of particular traffic, past data records, and the like that may be used to test a new addition, or new version of, the backend component. The portion selected may be based on preferences or settings by a tester to be ran in an automated manner by an automated testing process, or may be sampled randomly or procedurally based on incoming traffic and/or past data records. At step 804, a dynamic testing router is executed to shift, divert, or duplicate a portion of traffic for the test data loads. The dynamic testing router may be used to shift an amount of incoming traffic to test the new addition or version of the backend component in order to provide stress on the component and/or observe processing operations, errors, and/or overloading (e.g., slowdown) of the backend component being tested. The dynamic testing router may also duplicate and provide synthetic or procedurally generated users having data loads in order to test the backend component.

At step 806, circuit breakers are triggered to test frontend components and failover conditions with fallbacks. In this regard, traffic may be diverted or copied, or other data loads may be used, to apply pressure to certain computing services and/or components in order to test circuit breakers that detect slowdown or degradation over a threshold, and thereafter trigger or trip to go to a failover state and utilize a fallback service, application, or other component. The circuit breakers may be used to detect failover states based on whether components may be overloaded due to unbalanced and/or diverted traffic, errors, slowdown caused by hardware and/or software, and the like. Thus, the circuit breakers may be tripped in order to identify issues and correct fallback components and operations may be determined.

At step 808, a validation orchestrator is utilized to test degradation and issues caused in the frontend component. The validation orchestrator may be used with data load tests that are automatically run in a reoccurring manner for a user interface or other frontend component. This may be done in order to determine degradation, errors, and/or other slowdown or failures in the frontend component that may be caused by backend components including new, or new versions of, backend components. The validation orchestrator may be used to scale up load tests for the user interface, which may not behave similarly for all users and devices. This allows for tests to be run and stress applied to the system. Thus, a context may be determined for any degradations and effects on application, user interface, or other frontend component. A threshold of degradation may be used prior to reporting any degradation, such as over a limit of slowdown or errors. The validation orchestrator also allows for adjustment of machines and other cloud computing resources for data loads and tests. At step 810, test results are provided from testing the backend component. This may correspond to results from steps 804, 806, and 808, where individual operations may identify and report issues with running data loads for tests and/or diverted or duplicated traffic for a new or new version of a component, triggering of circuit breakers and fallback components and operations, and usage of the validation orchestrator to determine degradation.

Additionally, ML models may be trained to provide predictive classification of issues from testing the backend component for identification of issues, degradation, component and/or service overloading, and the like. When training ML models, one or more ML model algorithms and training frameworks may be used. ML models may include trained layers such that input features and corresponding data at an input layer yield or provides an output classification or decision at an output layer. ML models may include different layers, such as an input layer, one or more hidden layers, and an output layer, each having one or more nodes, however, different layers may also be utilized. For example, ML models may include as many hidden layers trained for classification and/or decision-making as necessary or appropriate. Nodes in each layer may be connected to nodes in an adjacent layer. In this example, ML models receive a set of input values for corresponding features and produce one or more output values, such as a classification and/or decision of distribution of storage over storage devices during different times based on different storage device information. However, different and/or more outputs may also be provided based on the training. When ML models are used to, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. The values generated by the hidden layer nodes may be used by the output layer node to produce an output value. ML models may be separately trained using training data, where the nodes in the hidden layer may be trained (adjusted) such that an optimal output (e.g., a classification) is produced in the output layer based on the training data. By continuously providing different sets of training data and penalizing ML models when the output is incorrect, ML models (and specifically, the representations of the nodes in the hidden layer) may be trained (adjusted) to improve performance of the ML models in data classification. Adjusting ML models may include separately adjusting the weights associated with each node in the hidden layer.

Benefits of the coordinated testing techniques disclosed herein are numerous and include improved system telemetry insight, improved circuit breaking testing, and dramatically improved performance testing. As discussed above and further emphasized here, FIGS. 1, 2, 3, 4, 5, 6, 7, and 8 are merely examples of cloud computing environment 120 and corresponding methods for automated testing of backend components prior to or during deployment and rollout, which examples should not be used to unduly limit the scope of the claims. One of ordinary skill in the art would recognize many variations, alternatives, and modifications.

Figure 9:
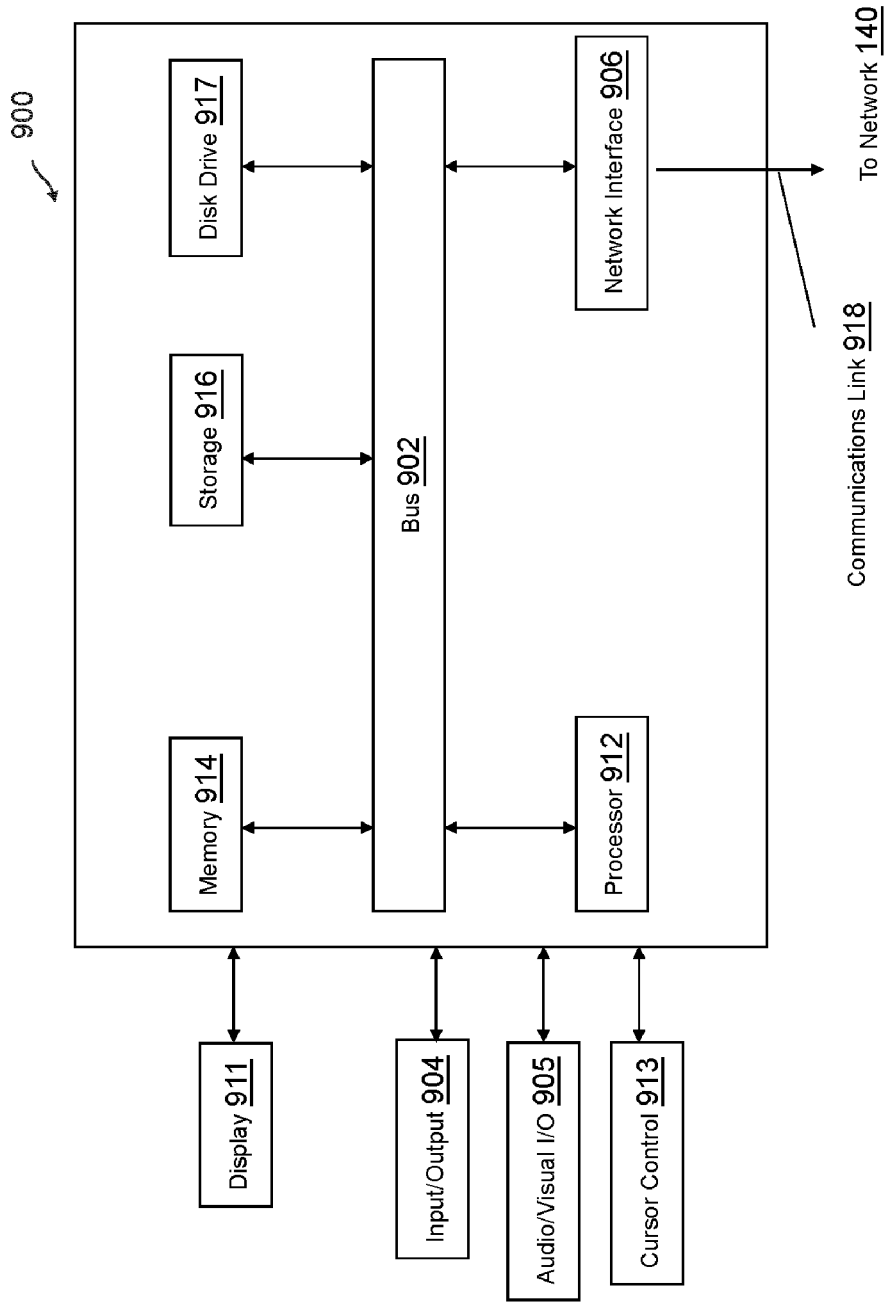
FIG. 9 is a simplified diagram of a computing device according to some embodiments.

FIG. 9 is a block diagram of a computer system suitable for implementing one or more components in FIG. 1, according to an embodiment. In various embodiments, the communication device may include a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons, image, or links, and/or moving one or more images, etc., and sends a corresponding signal to bus 902. I/O component 904 may also include an output component, such as a display 911 and a cursor control 913 (such as a keyboard, keypad, mouse, etc.). An optional audio/visual input/output component 905 may also be included to allow a user to use voice for inputting information by converting audio signals. Audio/visual I/O component 905 may allow the user to hear audio, and well as input and/or output video. A transceiver or network interface 906 transmits and receives signals between computer system 900 and other devices, such as another communication device, service device, or a service provider server via network 140. In one embodiment, the transmission is wireless, although other transmission mediums and methods may also be suitable. One or more processors 912, which can be a micro-controller, digital signal processor (DSP), or other processing component, processes these various signals, such as for display on computer system 900 or transmission to other devices via a communication link 918. Processor(s) 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor(s) 912 and other components by executing one or more sequences of instructions contained in system memory component 914. Logic may be encoded in a computer readable medium, which may refer to any medium that participates in providing instructions to processor(s) 912 for execution. Such a medium may take many forms, including but not limited to, non-volatile media, volatile media, and transmission media. In various embodiments, non-volatile media includes optical or magnetic disks, volatile media includes dynamic memory, such as system memory component 914, and transmission media includes coaxial cables, copper wire, and fiber optics, including wires that include bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A cloud computing system configured to test a cloud-native application to improve cloud-native application suitability, the cloud computing system comprising:
a processor and a computer readable medium operably coupled thereto, the computer readable medium comprising a plurality of instructions stored in association therewith that are accessible to, and executable by, the processor, to perform cloud-based testing operations which comprise:
accessing the cloud-native application using an automated testing routine, wherein the cloud-native application is associated with a plurality of interconnected components;
adjusting one or more of a network path of an interaction among the plurality of interconnected components, the automated testing routine, or an infrastructure component affecting the cloud-native application;
observing one or more of cloud-native application testing results or cloud-native application system telemetry based on the adjusting, wherein the observing comprises:
monitoring computing operations of the cloud-native application based on traffic processed through at least one of the plurality of interconnected components, and
generating the one or more of the cloud-native application testing results or the cloud-native application system telemetry based on the monitoring;
determining an issue with the cloud-native application based on the observing, wherein the issue affects the computing operations of the cloud-native application when processing the traffic;
performing one or more configuration adjustments to at least one of the cloud-native application or the plurality of interconnected components in response to determining the issue;
based on the one or more configuration adjustments, determining an executable operation that automatically performs a load backoff of a data load handled by one or more of the plurality of interconnected components and reroutes the data load from the load backoff when the issue is detected;
injecting the executable operation between two or more of the plurality of interconnected components affected by the issue;
triggering the executable operation based on the issue affecting the computing operations of the cloud-native application; and
identifying an effect of the executable operation on a frontend of the cloud-native application when the executable operation is triggered.

2. The cloud computing system of claim 1, wherein each of the plurality of interconnected components are interconnected in a service mesh of the cloud computing system that is provided over a network to one or more cloud computing tenants.

3. The cloud computing system of claim 1, wherein the accessing includes deploying a sidecar into the cloud-native application as a subcomponent, and wherein the observing includes receiving the cloud-native application testing results and the cloud-native application system telemetry from the sidecar.

4. The cloud computing system of claim 1, wherein the adjusting includes interfacing with a dynamic testing router that executes a plurality of test runs for a plurality of test data loads with the cloud-native application.

5. The cloud computing system of claim 1, wherein at least one of the cloud-native application testing results or the cloud-native application system telemetry include at least one of origin traceability data between the automated testing routine and the plurality of interconnected components, observed timings of interactions between the automated testing routine and the plurality of interconnected components, or system telemetry of the plurality of interconnected components.

6. The cloud computing system of claim 5, wherein the determining the issue comprises identifying contributing factors to the issue that are associated with the origin traceability data.

7. The cloud computing system of claim 1, wherein the cloud-based testing operations further comprise:
evaluating observed timings and system telemetry from the cloud-native application testing results or the cloud-native application system telemetry based on an acceptability threshold; and
performing an action when the acceptability threshold is exceeded, wherein the action comprises at least one of: a fast fail of at least one of the plurality of interconnected components, a rollback of a version update, or a presentation of an alert.

8. The cloud computing system of claim 1, wherein the performing the one or more configuration adjustments the one or more configuration adjustments includes reconfiguring, based on predetermined acceptability of adjustment boundaries, at least one of a configuration of the cloud-native application, a fault of the automated test routine, or one or more cloud-native application instructions.

9. The cloud computing system of claim 1, wherein the cloud-based testing operations further comprise:
periodically outputting data to another computerized application of the cloud computing system, wherein the data comprises at least one of the cloud-native application testing results, the cloud-native application system telemetry, the issue, or the one or more configuration adjustments.

10. The cloud computing system of claim 1, wherein the cloud-based testing operations further comprise:
developing a decision-making model from the adjusting, the observing, and the determining based on an initial test data load;
repeating the adjusting, the observing, and the determining based on a plurality of test data loads; and
refining the decision-making model based on the repeating.

11. A method to test a cloud-native application to improve cloud-native application suitability in a cloud computing system, the method comprising:
accessing the cloud-native application using an automated testing routine, wherein the cloud-native application is associated with a plurality of interconnected components;
adjusting one or more of a network path of an interaction among the plurality of interconnected components, the automated testing routine, or an infrastructure component affecting the cloud-native application;

observing one or more of cloud-native application testing results or cloud-native application system telemetry based on the adjusting, wherein the observing comprises:
  monitoring computing operations of the cloud-native application based on traffic processed through at least one of the plurality of interconnected components, and
  generating the one or more of the cloud-native application testing results or the cloud-native application system telemetry based on the monitoring;
determining an issue with the cloud-native application based on the observing, wherein the issue affects the computing operations of the cloud-native application when processing the traffic;
performing one or more configuration adjustments to at least one of the cloud-native application or the plurality of interconnected components in response to determining the issue;
based on the one or more configuration adjustments, determining an executable operation that automatically performs a load backoff of a data load handled by one or more of the plurality of interconnected components and reroutes the data load from the load backoff when the issue is detected;
injecting the executable operation between two or more of the plurality of interconnected components affected by the issue;
triggering the executable operation based on the issue affecting the computing operations of the cloud-native application; and
identifying an effect of the executable operation on a frontend of the cloud-native application when the executable operation is triggered.

12. The method of claim 11, wherein the accessing includes deploying a sidecar into the cloud-native application as a subcomponent, and wherein the observing includes receiving the cloud-native application testing results and the cloud-native application system telemetry from the sidecar.

13. The method of claim 11, wherein the adjusting includes interfacing with a dynamic testing router that executes a plurality of test runs for a plurality of test data loads with the cloud-native application.

14. The method of claim 11, wherein at least one of the cloud-native application testing results or the cloud-native application system telemetry include at least one of origin traceability data between the automated testing routine and the plurality of interconnected components, observed timings of interactions between the automated testing routine and the plurality of interconnected components, or system telemetry of the plurality of interconnected components.

15. The method of claim 11, further comprising:
  evaluating observed timings and system telemetry from the cloud-native application testing results or the cloud-native application system telemetry based on an acceptability threshold; and
  performing an action when the acceptability threshold is exceeded, wherein the action comprises at least one of: a fast fail of at least one of the plurality of interconnected components, a rollback of a version update, or a presentation of an alert.

16. A non-transitory computer-readable medium having stored thereon computer-readable instructions executable to test a cloud-native application to improve cloud-native application suitability in a cloud computing system, the computer-readable instructions executable to perform cloud-based testing operations which comprises:
  accessing the cloud-native application using an automated testing routine, wherein the cloud-native application is associated with a plurality of interconnected components;
  adjusting one or more of a network path of an interaction among the plurality of interconnected components, the automated testing routine, or an infrastructure component affecting the cloud-native application;
  observing one or more of cloud-native application testing results or cloud-native application system telemetry based on the adjusting, wherein the observing comprises:
    monitoring computing operations of the cloud-native application based on traffic processed through at least one of the plurality of interconnected components, and
    generating the one or more of the cloud-native application testing results or the cloud-native application system telemetry based on the monitoring;
  determining an issue with the cloud-native application based on the observing, wherein the issue affects the computing operations of the cloud-native application when processing the traffic;
  performing one or more configuration adjustments to at least one of the cloud-native application or the plurality of interconnected components in response to determining the issue;
  based on the one or more configuration adjustments, determining an executable operation that automatically performs a load backoff of a data load handled by one or more of the plurality of interconnected components and reroutes the data load from the load backoff when the issue is detected;
  injecting the executable operation between two or more of the plurality of interconnected components affected by the issue;
  triggering the executable operation based on the issue affecting the computing operations of the cloud-native application; and
  identifying an effect of the executable operation on a frontend of the cloud-native application when the executable operation is triggered.

17. The non-transitory computer-readable medium of claim 16, wherein the accessing includes deploying a sidecar into the cloud-native application as a subcomponent, and wherein the observing includes receiving the cloud-native application testing results and the cloud-native application system telemetry from the sidecar.

18. The non-transitory computer-readable medium of claim 16, wherein the adjusting includes interfacing with a dynamic testing router that executes a plurality of test runs for a plurality of test data loads with the cloud-native application.

19. The non-transitory computer-readable medium of claim 16, wherein at least one of the cloud-native application testing results or the cloud-native application system telemetry include at least one of origin traceability data between the automated testing routine and the plurality of interconnected components, observed timings of interactions between the automated testing routine and the plurality of interconnected components, or system telemetry of the plurality of interconnected components.

20. The non-transitory computer-readable medium of claim 16, wherein the cloud-based testing operations further comprise:

evaluating observed timings and system telemetry from the cloud-native application testing results or the cloud-native application system telemetry based on an acceptability threshold; and performing an action when the acceptability threshold is exceeded, wherein the action comprises at least one of: a fast fail of at least one of the plurality of interconnected components, a rollback of a version update, or a presentation of an alert.

* * * * *